(No Model.)
J. T. KENWORTHY.
DRIFT AND DRILL CATCH.
No. 404,546. Patented June 4, 1889.
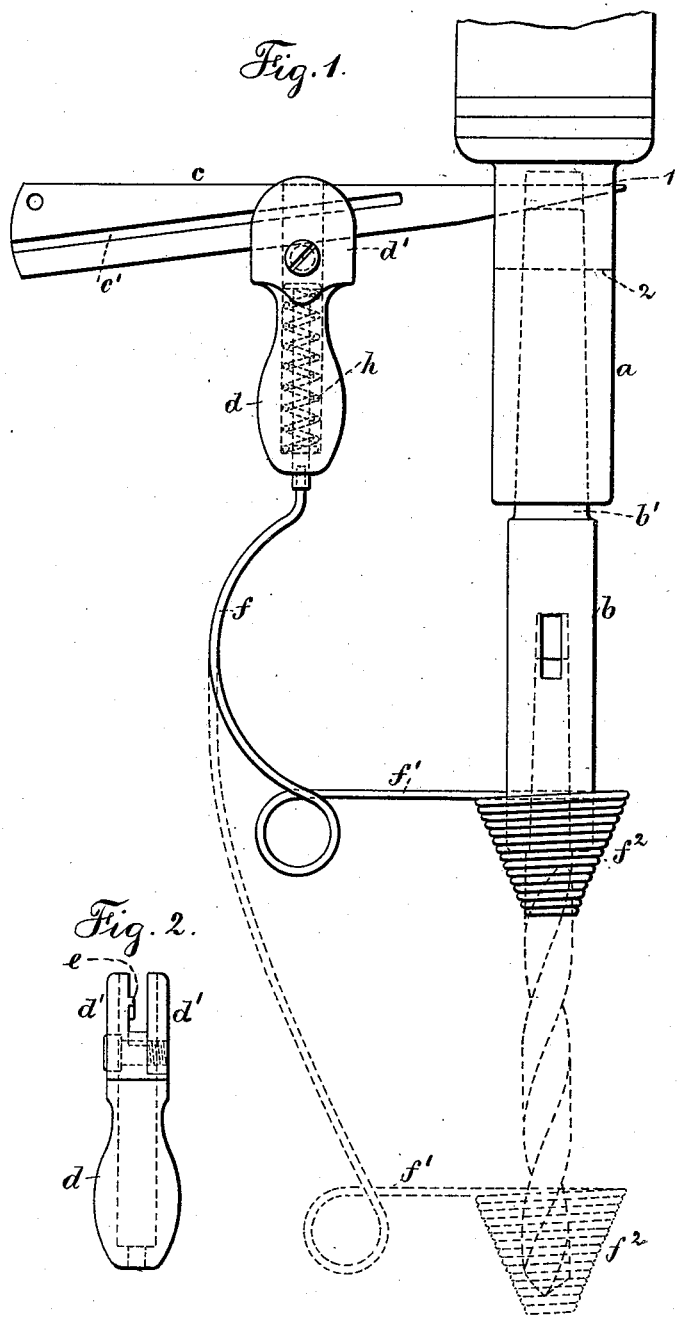

UNITED STATES PATENT OFFICE.

JOHN T. KENWORTHY, OF FLUSHING, NEW YORK.

DRIFT AND DRILL CATCH.

SPECIFICATION forming part of Letters Patent No. 404,546, dated June 4, 1889.

Application filed September 20, 1888. Serial No. 285,853. (No model.)

*To all whom it may concern:*

Be it known that I, JOHN T. KENWORTHY, of Flushing, in the county of Queens and State of New York, have invented an Improvement in Drift and Drill Catches; and the following is declared to be a description of the same.

In vertical-drilling machines the tool is sometimes received into the recessed end of the revolving mandrel or shaft, and in other instances the tool is inserted into a stock or holder having a shank that passes into the recess of the mandrel. In either instance the pressure in drilling causes the shank to become firmly bound into the socket, and a wedge or drift tool has to be driven in above the shank and through a mortise prepared for it, so as to detach the tool, and the tool or the tool and its holder are liable to drop suddenly and injure the work, or to become injured by falling on the floor or upon the bed of the machine.

My invention relates to a movable holder to be applied to the drill before the same is loosened from the mandrel, so as to catch and support the drill, or the drill and its stock, as the same may be detached from the mandrel by the drift tool or wedge.

In the drawings, Figure 1 is an elevation representing my device as applied for use, and Fig. 2 is a detached view of the handle of the holder.

The lower end of the mandrel or shaft of the boring-machine is shown at $a$, and in this is a slightly-tapering hole forming a socket for the shank of the boring-tool, or for the shank of the tool-holder $b$, and I have shown by dotted lines a twist-drill in the tool-holder $b$. A mortise is provided transversely through the mandrel $a$ at the upper end of the socket for the tool or holder, as shown by dotted lines 1 2, and a similar mortise is provided through the holder $b$. These are of the ordinary character, in order that a drift tool or wedge $c$ may be driven into such mortise for forcing the shank of the tool or of the tool-holder downwardly and detaching the same from the mandrel $a$. These parts, being well known, do not require further description.

I make use of a basket or holder $f^2$, which is preferably conical and of wire, convoluted, and it may be expanded more or less by thrusting the same from the bottom of the drill upwardly around such drill, and such convoluted holder will grasp the drill more or less, or it may be applied at the lower end of the tool-holder $b$, as shown by full lines; but usually the basket will have a closed bottom. It is to be understood that this basket or holder $f^2$ is only applied to the drill when the same is at rest, and has to be removed from the drilling-machine, and that different sizes of baskets might be provided, if necessary.

In order to facilitate the handling of the basket or holder, I provide for connecting the same with the drift tool or wedge, and for this purpose it is preferable to groove the edges of the wedge $c$, as at $c'$, and to provide the handle $d$, that is notched in the head portion $d'$, and provided with a feather $e$, so that it may be slipped upon and serve as a handle for the wedge $c$, and there is a connection $f$ $f'$ from this handle $d$ to the basket $f^2$. I prefer to make this connection as a continuation of the convoluted wire forming the basket and to provide a spring-coil between the portions $f$ and $f'$, and within the handle $d$, which is tubular, there is a helical spring $h$ and a rod with a head, to which rod the connection $f$ is attached, so that the spring will yield to the weight of the parts or to the movement of the drift-wedge as the same is moved to its place after the basket has been placed to receive and hold the drill or its stock.

The connection $f$ $f'$ may be long, so as to allow of the basket being placed below the lower end of the drill, as seen in Fig. 1 by dotted lines.

The wedge may be held by the handle $d$ while a hammer is applied to drive the wedge in and separate the shank from the socket in the mandrel or tool-holder.

It is to be understood that when the tool is to be removed the basket is first placed in position below or around the tool or tool-stock, and the wedge is driven in sufficiently to loosen the shank, and that the basket below the drill or its stock prevents the shank dropping down out of its socket, and that the workman then takes the tool or stock in his hand to remove the same.

I claim as my invention—

1. The combination, with the wedge or drift tool for separating the shank of the tool or tool-holder from the vertical mandrel, of the basket for holding the tool, and a connection between the basket and drift-tool, substantially as set forth.

2. The combination, with the wedge or drift tool having grooves $c'$ in its side, of the basket for holding the tool, the handle $d$ for receiving the wedge, and a connection from the same to the basket, substantially as specified.

3. The combination, with the wedge or drift tool, of the handle $d$, a spring within the handle, a basket for holding the drill or its stock, and a connection between the basket and the spring within the handle, substantially as specified.

Signed by me this 15th day of September, 1888.

JOHN T. KENWORTHY.

Witnesses:
EDWIN G. ROFF,
FERNANDO T. WHITING.